(12) United States Patent
Vasseur et al.

(10) Patent No.: US 10,785,090 B2
(45) Date of Patent: Sep. 22, 2020

(54) USING MACHINE LEARNING BASED ON CROSS-SIGNAL CORRELATION FOR ROOT CAUSE ANALYSIS IN A NETWORK ASSURANCE SERVICE

(71) Applicant: Cisco Technology, Inc., San Jose, CA (US)

(72) Inventors: Jean-Philippe Vasseur, Saint Martin D'uriage (FR); Grégory Mermoud, Veyras (CH); Santosh Ghanshyam Pandey, Fremont, CA (US); Vikram Kumaran, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 15/983,437

(22) Filed: May 18, 2018

(65) Prior Publication Data
US 2019/0356533 A1    Nov. 21, 2019

(51) Int. Cl.
*H04L 12/24* (2006.01)
*H04L 12/26* (2006.01)
(Continued)

(52) U.S. Cl.
CPC .......... *H04L 41/064* (2013.01); *G06N 20/00* (2019.01); *H04L 41/14* (2013.01); *H04L 43/08* (2013.01);
(Continued)

(58) Field of Classification Search
CPC ... H04L 41/064; H04L 41/14; H04L 61/2015; H04L 61/203; G06N 20/00
See application file for complete search history.

(56) References Cited

U.S. PATENT DOCUMENTS

| 8,762,301 B1 * | 6/2014 | Buckbee, Jr. .......... G06N 20/00 706/12 |
| 2004/0088406 A1 | 5/2004 | Corley et al. |

(Continued)

OTHER PUBLICATIONS

"Anomaly Detection Using K-Means Clustering", https://anomaly.io/anomaly-detection-clustering/, 10 pages, Jun. 30, 2015, Anomaly.

(Continued)

*Primary Examiner* — John M Macilwinen
(74) *Attorney, Agent, or Firm* — Behmke Innovation Group LLC; Kenneth J. Heywood; Jonathon P. Western

(57) ABSTRACT

In one embodiment, a network assurance service associates a target key performance indicator (tKPI) measured from a network with a plurality of causation key performance indicators (cKPIs) measured from the network that may indicate a root cause of a tKPI anomaly. The network assurance service applies a machine learning-based anomaly detector to the tKPI over time, to generate tKPI anomaly scores. The network assurance service calculates, for each of cKPIs, a mean and standard deviation of that cKPI using a plurality of different time windows associated with the tKPI anomaly scores. The network assurance service uses the calculated means and standard deviations of the cKPIs in the different time windows to calculate cross-correlation scores between the tKPI anomaly scores and the cKPIs. The network assurance service selects one or more of the cKPIs as the root cause of the tKPI anomaly based on their calculated cross-correlation scores.

14 Claims, 12 Drawing Sheets

(51) Int. Cl.
*G06N 20/00* (2019.01)
*H04L 29/12* (2006.01)
(52) U.S. Cl.
CPC ........ *H04L 61/203* (2013.01); *H04L 61/2015* (2013.01)

(56) References Cited

U.S. PATENT DOCUMENTS

| | | | | |
|---|---|---|---|---|
| 2009/0171879 | A1* | 7/2009 | Bullen | G06N 7/005 706/47 |
| 2014/0046863 | A1 | 2/2014 | Gifford et al. | |
| 2015/0074035 | A1* | 3/2015 | Narasappa | G06N 7/005 706/52 |
| 2015/0172096 | A1* | 6/2015 | Sadovsky | H04L 41/0631 709/224 |
| 2016/0147585 | A1* | 5/2016 | Konig | G06F 11/3419 714/37 |
| 2017/0094537 | A1 | 3/2017 | Yang et al. | |
| 2017/0104774 | A1 | 4/2017 | Vasseur et al. | |
| 2017/0208487 | A1* | 7/2017 | Ratakonda | H04W 24/04 |
| 2017/0310546 | A1* | 10/2017 | Nair | H04L 41/0654 |
| 2018/0027004 | A1 | 1/2018 | Huang et al. | |
| 2019/0056983 | A1* | 2/2019 | Jeong | G06F 11/0775 |

OTHER PUBLICATIONS

"Detecting Anomalies in Correlated Time Series", https://anomaly.io/detect-anomalies-in-correlated-time-series/, 8 pages, Jan. 25, 2017, Anomaly.

"Coherence (Signal Processing)", https://en.wikipedia.org/w/index.php?title-Coherence_(signal_processing)&oldid=773734092, 3 pages, Edited Apr. 4, 2017, Printed May 10, 2018, Wikipedia.

"Coherence (Signal Processing)", https://en.wikipedia.org/w/index.php?title-Coherence Asignal_processing)&oldid=773734092, 3 pages, Edited Apr. 4, 2017, Printed May 10, 2018, Wikipedia.

* cited by examiner

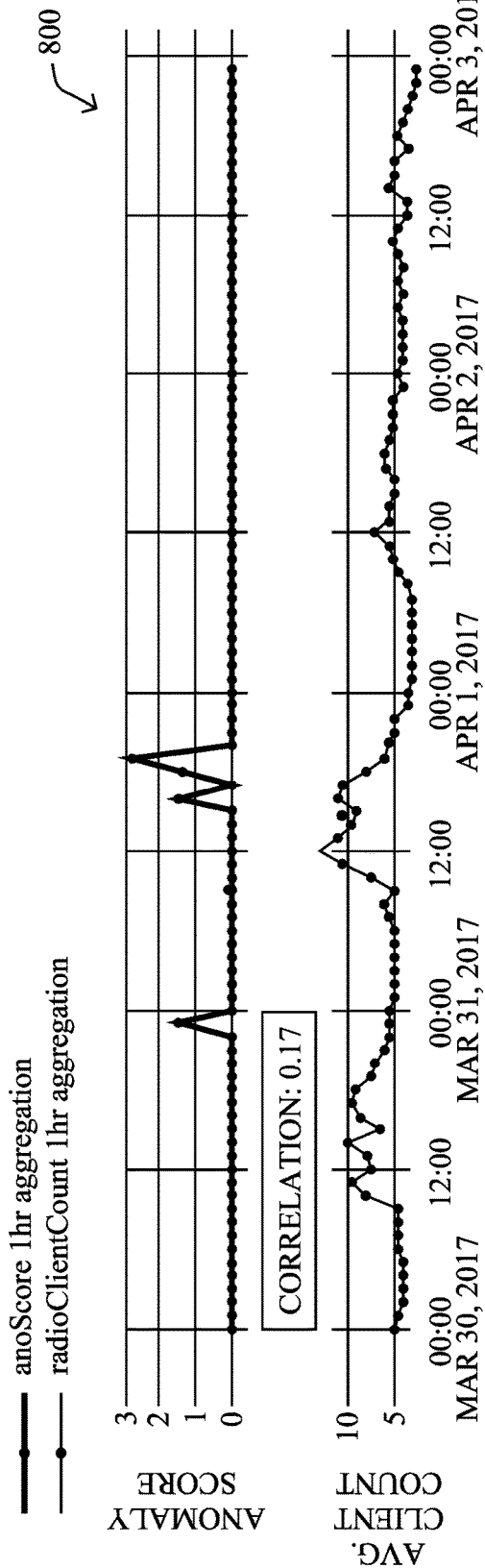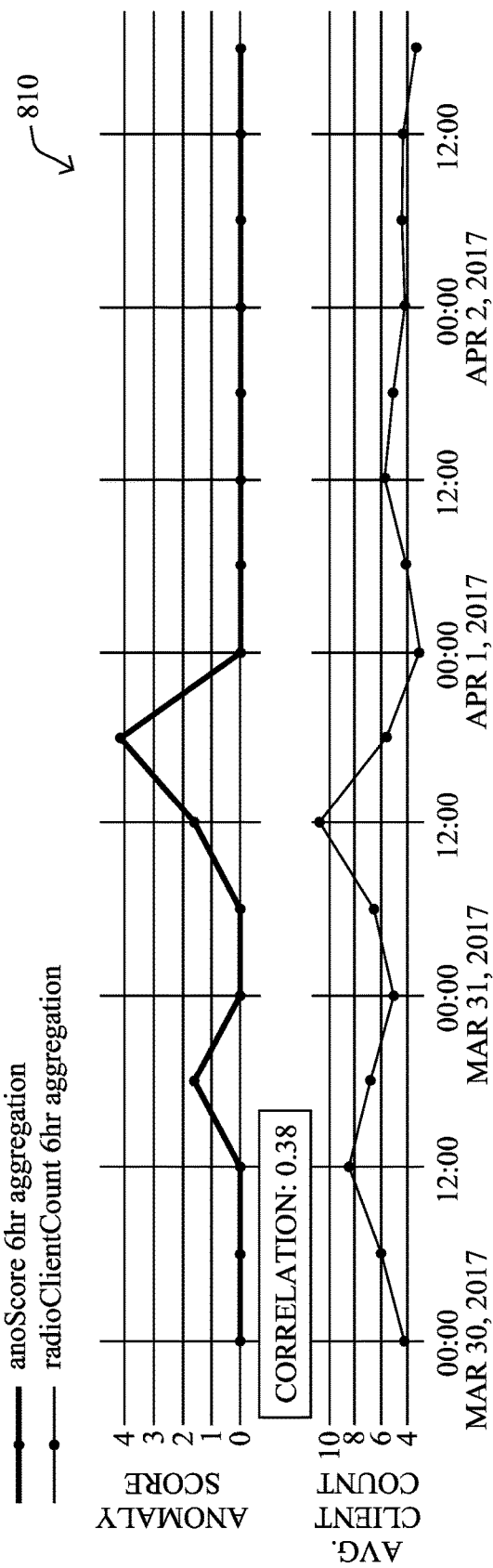
FIG. 8A
FIG. 8B

USING MACHINE LEARNING BASED ON CROSS-SIGNAL CORRELATION FOR ROOT CAUSE ANALYSIS IN A NETWORK ASSURANCE SERVICE

TECHNICAL FIELD

The present disclosure relates generally to computer networks, and, more particularly, to using machine learning based on cross-signal correlation for root cause analysis in a network assurance service.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8B illustrate examples of the cross correlation of a KPI with anomaly scores in different time windows;

DESCRIPTION OF EXAMPLE EMBODIMENTS

Overview

Figure 1A:
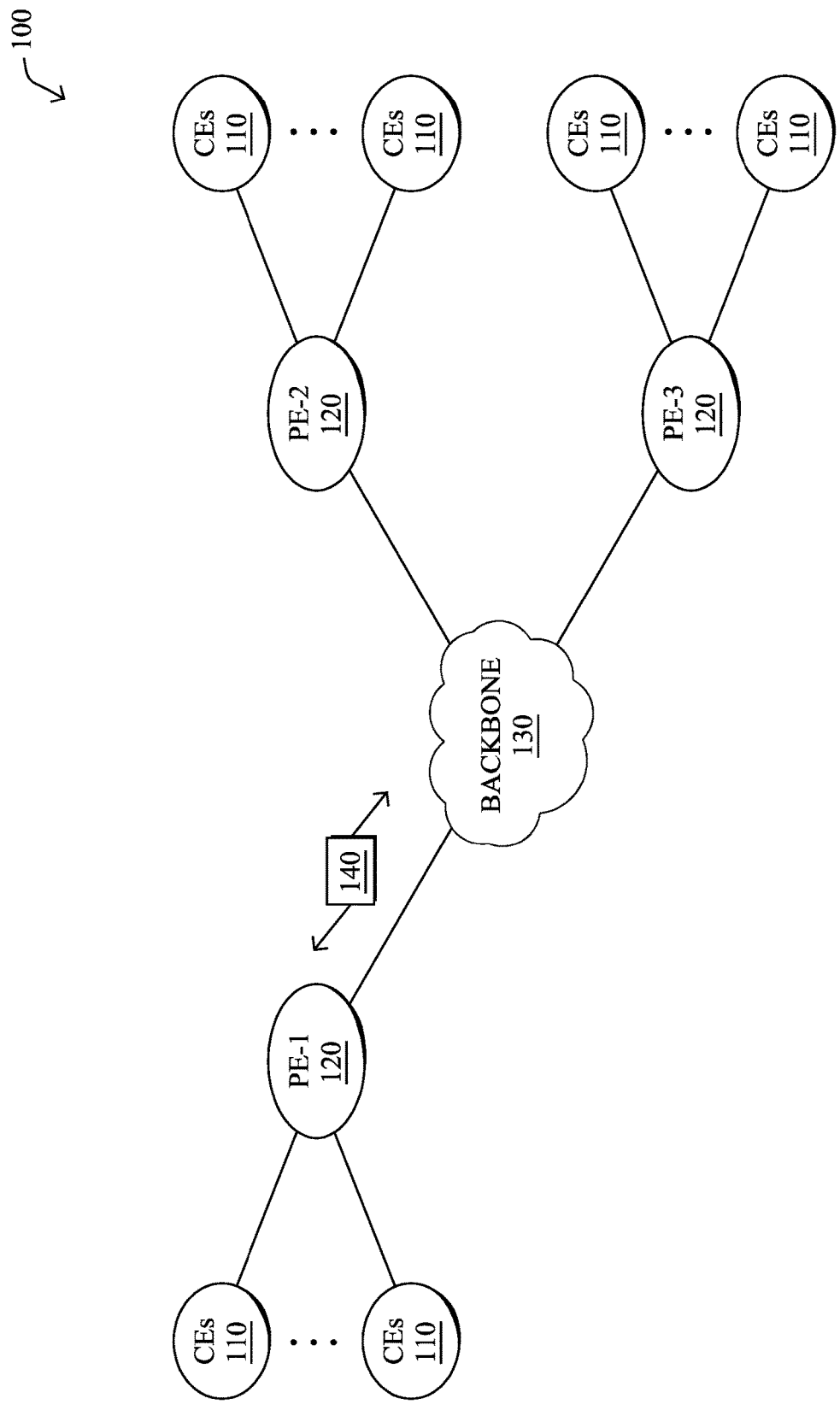
FIGS. 1A-1B illustrate an example communication network.

According to one or more embodiments of the disclosure, a network assurance service associates a target key performance indicator (tKPI) measured from a network with a plurality of causation key performance indicators (cKPIs) measured from the network that may indicate a root cause of a tKPI anomaly. The network assurance service applies a machine learning-based anomaly detector to the tKPI over time, to generate tKPI anomaly scores. The network assurance service calculates, for each of cKPIs, a mean and standard deviation of that cKPI using a plurality of different time windows associated with the tKPI anomaly scores. The network assurance service uses the calculated means and standard deviations of the cKPIs in the different time windows to calculate cross-correlation scores between the tKPI anomaly scores and the cKPIs. The network assurance service selects one or more of the cKPIs as the root cause of the tKPI anomaly based on their calculated cross-correlation scores.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
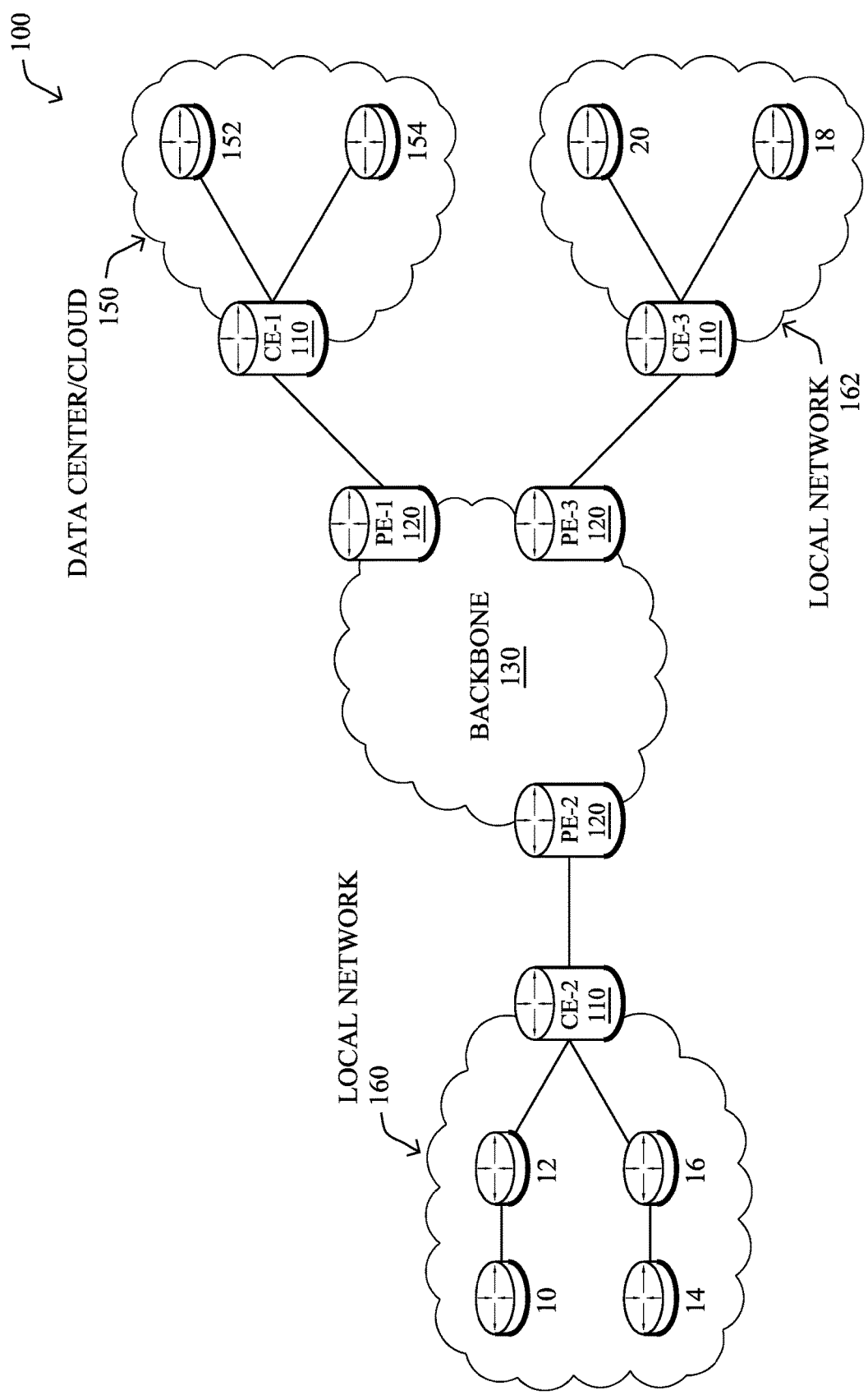

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
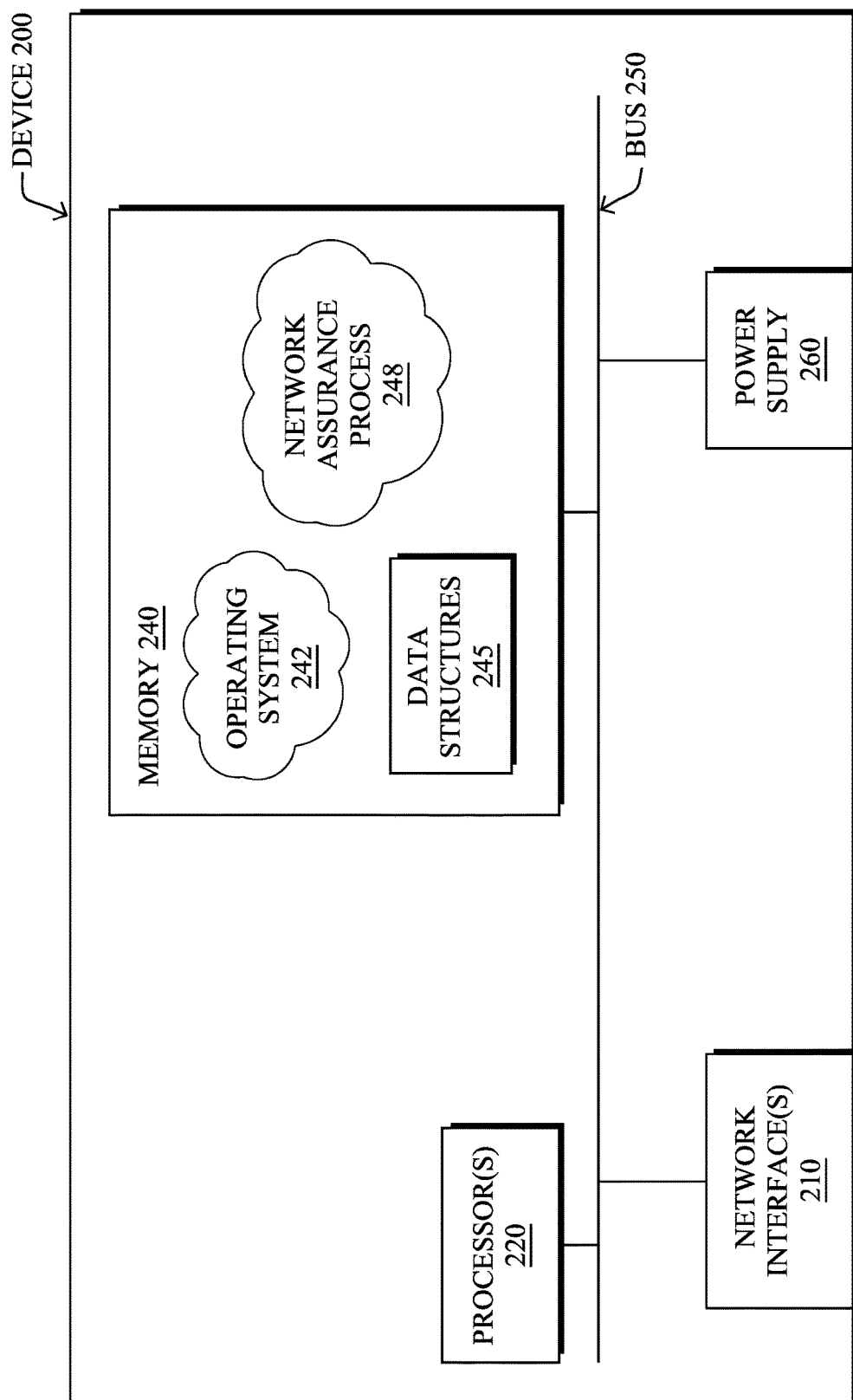
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
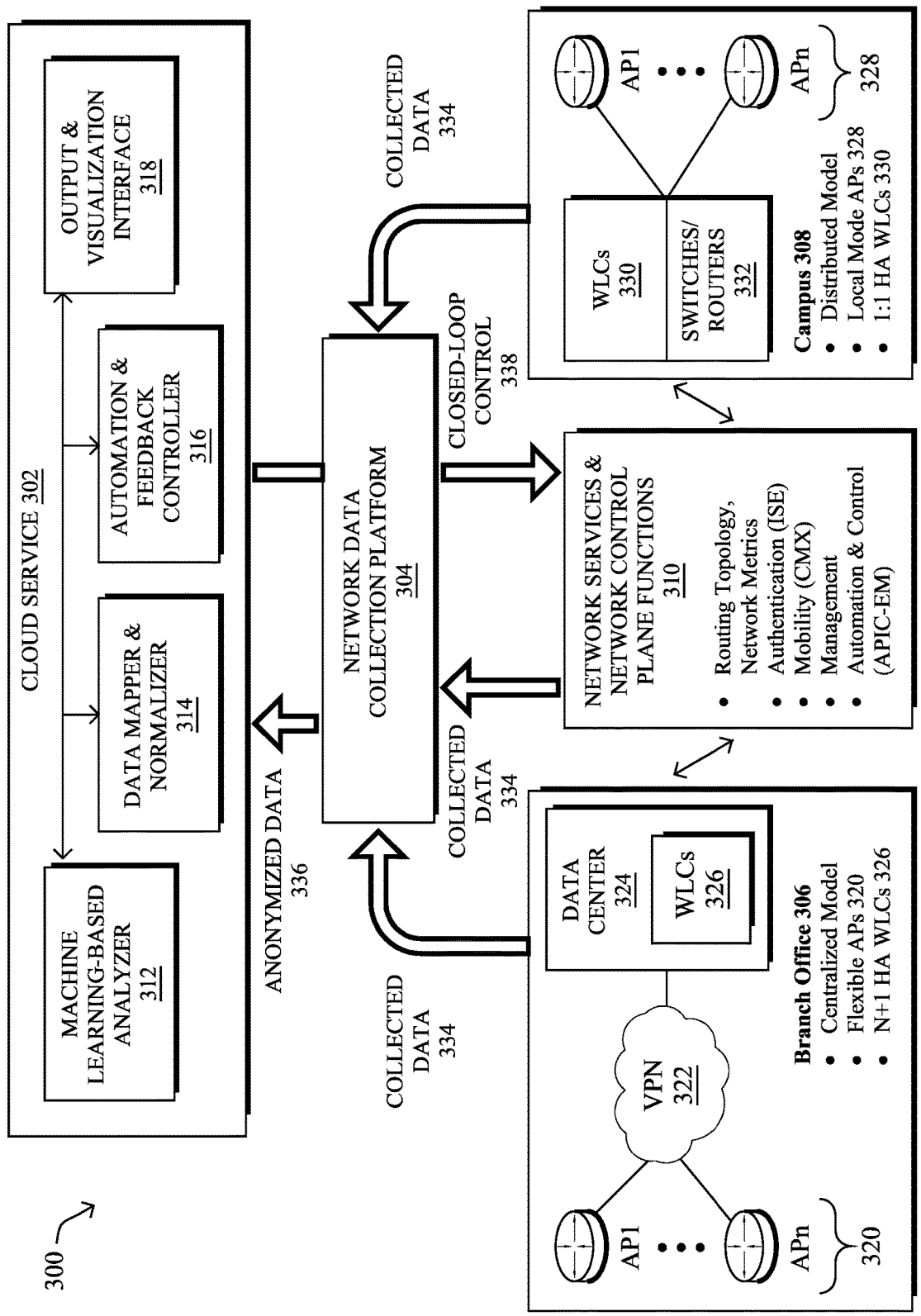
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance service may leverage machine learning-based anomaly detection, to detect network anomalies. Such detection may entail not only detecting abnormal behaviors/patterns, but also find their root cause(s), so as to trigger actionable remediation. Unfortunately, designing a machine learning process capable of both detecting an anomaly and finding its root cause is highly challenging. Thus, in many cases, the system may make use of two layers: the first layer is used for anomaly detection using for example a dual-regression on percentile values outputting a probable range of values for a given variable of interest, or using a neural network, whereas the second layer is in charge of finding the probable cause of the anomaly.

One possible approach for identifying insights into network failures entails analyzing common traits that are prevalent in the network. In a nutshell, this approach groups network entities (e.g., radios, access points, routers, switches, etc.) that are impacted by a given phenomenon (e.g., low throughput, reboots, etc.) based on categorical attributes (e.g., status of operation, OS version, the handling of a large number of hosts, etc.). If a given combination of attributes, also called a "trait," is shared by entities impacted by an issue, this combination is presented to the user as a candidate explanation.

Another approach to performing root cause analysis may entail automatically identifying the feature boundaries for network problems and tagging them as "symbols" that can be easily understandable by network administrators. It then employs interpretable models, such as Association Rule Mining, with the "symbolic features" to derive the human-understandable patterns that cause the network problems. The cognitive insights thus provide hints and concrete high-probability events that enable the network admin to understand and act on avoiding the network problems.

While the above techniques can be effective for root cause analysis, preliminary testing has shown that there is no one-size-fits-all approach. The best technique(s) may even sometimes be use cases dependent, whereas in other situations it is a combination of approaches that provides the most promising results.

Using Machine Learning Based on Cross-Signal Correlation for Root Cause Analysis in a Network Assurance Service The techniques herein introduce a root cause analysis approach that may be used in isolation or in combination with other techniques, and which relies on the cross-correlation of signals, coupled with a spike detector, and operating at multi time-scales. In some aspects, the techniques herein propose formation of a set of key performance indicators (KPIs) that are possible causes of an anomaly (e.g., as specified by a network administrator or subject matter expert, etc.). Cross correlation is then performed among the KPIs at multiple time scales to select probable causes, using a centralized minimum threshold correlation factor. Such a threshold can also be dynamically optimized using user feedback, so as to constantly improve the set of selected KPI. In further aspects, the techniques herein introduce a machine learning process that learns contextual correlations between signals, while also taking into account the range of values of the KPIs when computing cross-correlation. In further aspects, the techniques herein also introduce a mechanism that allows for KPI spike value detection, in addition to signal cross-correlation.

Specifically, according to one or more embodiments of the disclosure as described in detail below, a network assurance service associates a target key performance indicator (tKPI) measured from a network with a plurality of causation key performance indicators (cKPIs) measured from the network that may indicate a root cause of a tKPI anomaly. The network assurance service applies a machine learning-based anomaly detector to the tKPI over time, to generate tKPI anomaly scores. The network assurance service calculates, for each of cKPIs, a mean and standard deviation of that cKPI using a plurality of different time windows associated with the tKPI anomaly scores. The network assurance service uses the calculated means and standard deviations of the cKPIs in the different time windows to calculate cross-correlation scores between the tKPI anomaly scores and the cKPIs. The network assurance service selects one or more of the cKPIs as the root cause of the tKPI anomaly based on their calculated cross-correlation scores.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
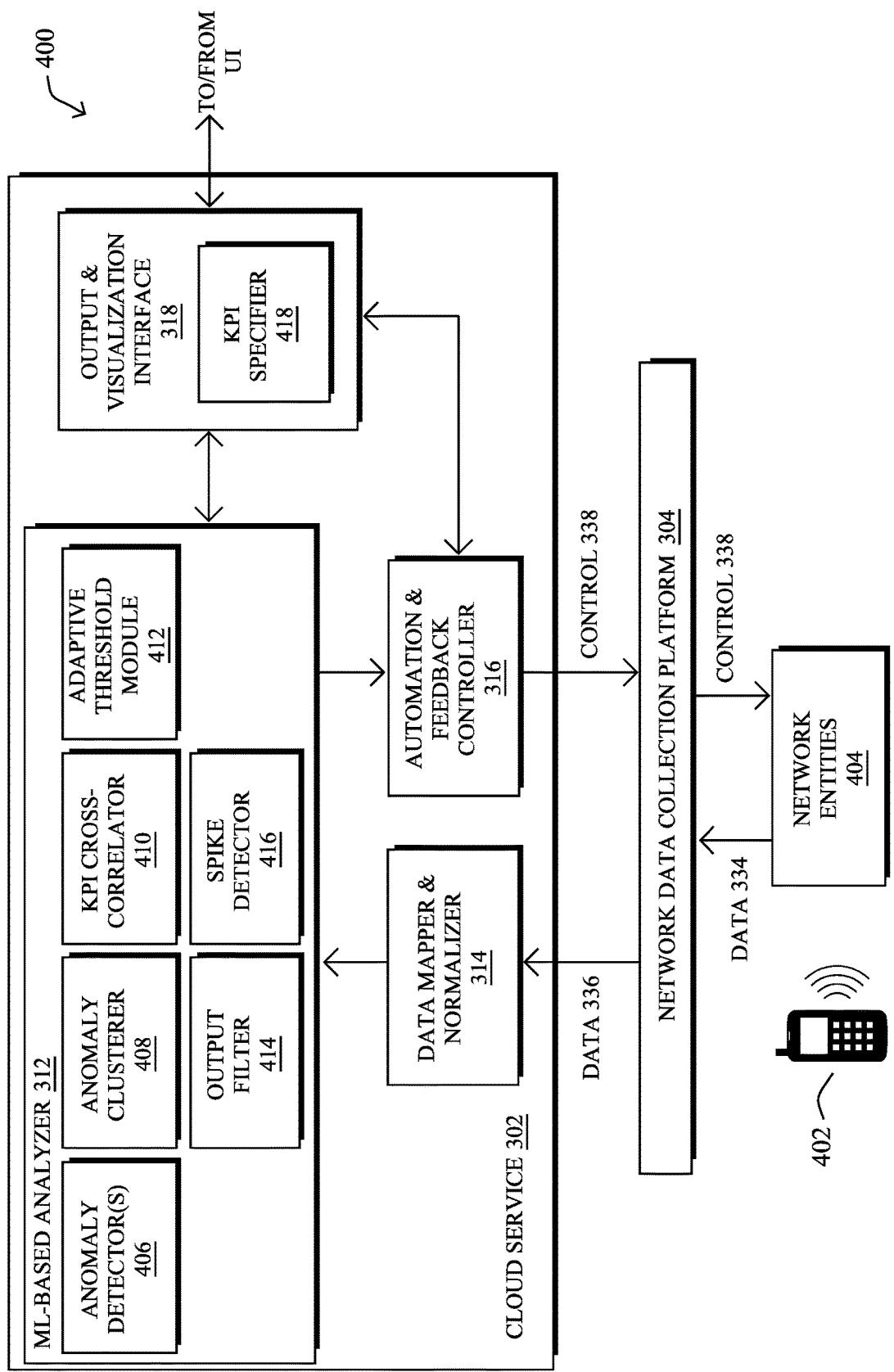
FIG. 4 illustrates an example architecture for performing cross signal correlation for root cause analysis in a network assurance service.

Operationally, FIG. 4 illustrates an example architecture 400 for dynamically adjusting prediction ranges in a network assurance system, according to various embodiments. At the core of architecture 400 may be the following components: one or more anomaly detectors 406, an anomaly clusterer 408, a KPI cross-correlator 410, an adaptive threshold module 412, an output filter 414, a spike detector 416, and/or a KPI specifier 418. In some implementations, the components 406-418 of architecture 400 may be implemented within a network assurance system, such as system 300 shown in FIG. 3. Accordingly, the components 406-418 of architecture 400 shown may be implemented as part of cloud service 302 (e.g., as part of machine learning-based analyzer 312 and/or output and visualization interface 318), as part of network data collection platform 304, and/or on one or more network elements/entities 404 that communicate with one or more client devices 402 within the monitored network itself. Further, these components 406-418 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 406. At the core of each anomaly detector 406 may be a corresponding anomaly detection model, such as an unsupervised learning-based model. When an anomaly detector 406 detects a network anomaly, output and visualization interface 318 may send an anomaly detection alert to a user interface (UI) for review by a subject matter expert (SME), network administrator, or other user. In particular, there may be any number of key performance indicators (KPIs) measured from the network that anomaly detector(s) 406 may assess. Notably, the anomaly detector(s) 406 may calculate anomaly scores for the KPIs over time and, if an anomaly score exceeds an anomaly detection threshold, anomaly detector(s) 406 may raise an anomaly detection alert.

To determine the root cause of a KPI anomaly, the techniques herein propose designating that particular KPI as a target KPI (tKPI) for which anomaly detector(s) 406 are used to detect tKPI anomalies. As would be appreciated any number of other KPIs may be the root cause of the tKPI anomalies. For illustrative purposes, the pool of KPIs that are potential root causes of the tKPI anomalies are referred to herein as causation KPIs (cKPIs). For example, if cloud service 302 is calibrated to detect abnormal on-boarding times in a wireless (or wired) network, then the on-boarding time is the tKPI and the cKPIs are all KPIs used to explain the issue.

Figure 5:
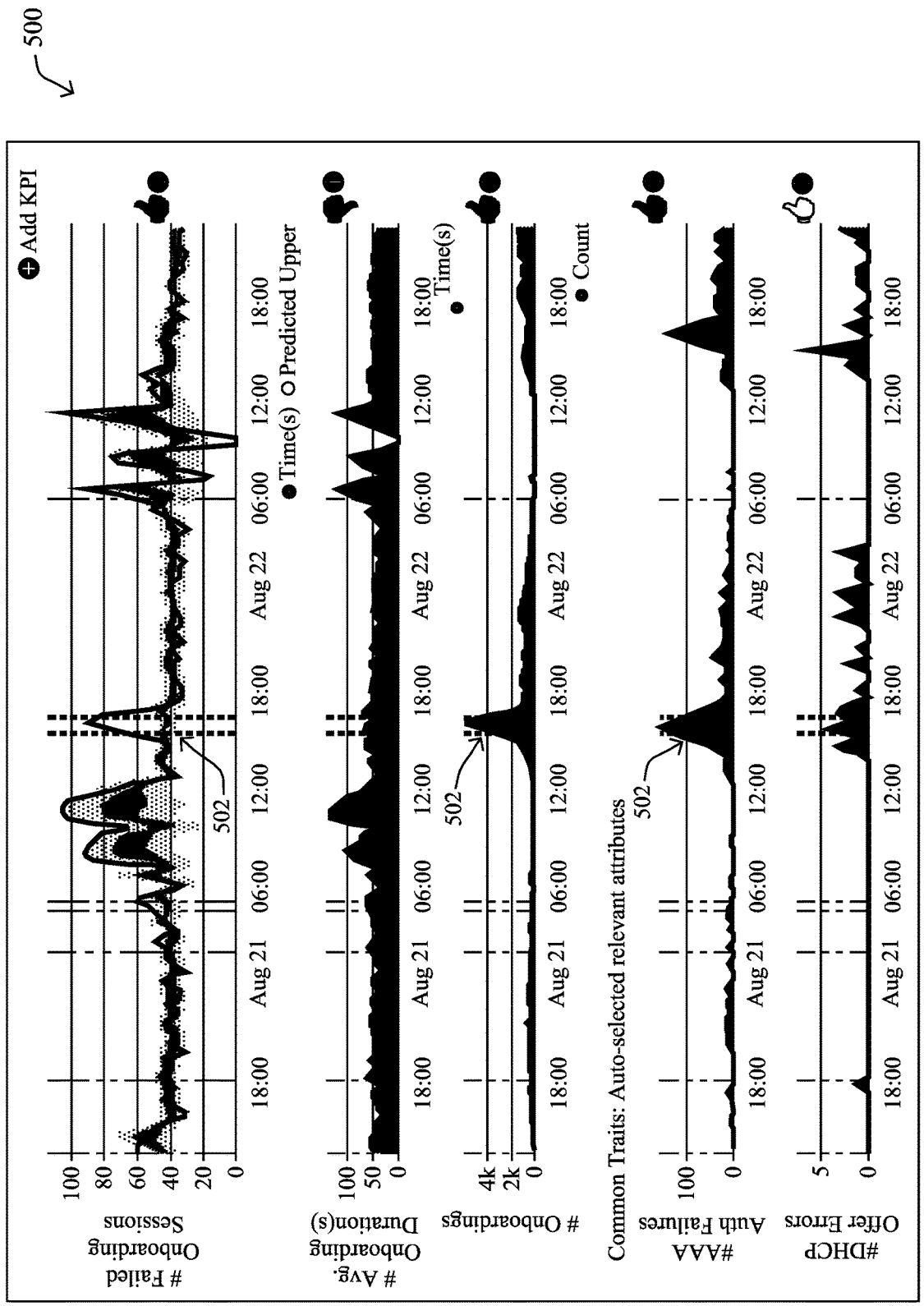
FIG. 5 illustrates an example set of key performance indicators (KPIs) over time.

FIG. 5 illustrates an example set of KPIs 500 over time, in various embodiments. As shown, assume that the number of failed onboarding sessions in the monitored network (e.g., number of times wireless clients failed to attach to the network) is the KPI of interest and, thus, may be designated the tKPI. In such a case, there are also a number of cKPIs available from the monitored network that may help to explain why the number of onboarding failures is anomalous at any given time. These cKPIs may include, for example, the average amount of onboarding durations observed in the network, the number of clients attempting to onboard to the network, the number of Authorization and Accounting (AAA) failures in the network, and/or the Dynamic Host Configuration Protocol (DHCP) error count. As can be seen in FIG. 5 at points 502, there is a clear correlation between the anomalies for the tKPI and two of the cKPIs: the number of on-boarding clients and the number of AAA authentication failures. Thus, when the network exhibits an anomalous number of onboarding failures, these failures may be attributable to a corresponding high number of clients attempting to onboard at a given time and/or a high number of AAA association failures for these clients.

Referring again to FIG. 4, output and visualization interface 318 in architecture 400 may include a KPI specifier 418 configured to allow a user to specify a tKPI and a set of cKPIs that may be the root cause of anomalies in the tKPI. For example, a subject matter expert (SME) may designate the plurality of cKPIs for association with a particular tKPI, according to a given policy. Note that there might be different sets of cKPIs for each use case of interest. Said differently, the specified set of cKPIs represent the most likely contributors to anomalies in the tKPI.

As described previously, the one or more anomaly detector(s) 406 may use machine learning to identify anomalous events based on calculated measures of anomaly severity. Such a measure is also referred to herein as an anomaly score. In various embodiments, the techniques herein propose attempting to determine the causation between the set of candidate cKPIs and an anomaly, as quantified by the anomaly scores from anomaly detector(s) 406, around the time of the anomaly.

The first step of the root cause analysis may entail an anomaly clusterer 408 looking at periods of high anomaly, as described by a cluster of anomalous events with the sum of the tKPI anomaly scores being high (e.g., above a certain threshold). The time window considered by anomaly clusterer 408 is an important choice and can be dynamically varied, depending on the time granularity of influence/correlation to be considered. Notably, while a change in some cKPI may influence the tKPI over many days, others may cause changes in the tKPI that happen within minutes or seconds.

Given a time period of reference, anomaly clusterer 408 may obtain the set of values for that time period for one or more cKPI from the set of cKPIs designated as potential root causes of a tKPI anomaly. In various embodiments, anomaly clusterer may also collect the corresponding set of values of the tKPI anomaly score from anomaly detector(s) 406, which measure the anomaly severity over various times.

According to various embodiments, architecture 400 may also include KPI cross-correlator 410 configured to perform cross-correlation across the time series of tKPI anomaly scores and the time series of cKPIs. In one embodiment, KPI cross-correlator 410 may perform this cross-correlation by first calculating the means and standard deviations of the time series for a given time window under analysis. For example, the resulting cross-correlation scores from KPI cross-correlator 410 may range from −1 to 1, indicating the degree of cross-correlation between the anomaly score time series and a cKPI time series. Of course, other ranges and score calculations can be used, in other implementations.

In one embodiment, KPI cross-correlator 410 may calculate such a cross-correlation score (cc) according to the following equation:

$$cc = \frac{1}{\sigma_x \sigma_y} E[(X_t - \mu_X)(Y_t - \mu_Y)]$$

where $\sigma_x$ is the standard deviation of the anomaly scores for the tKPI in the selected time window, $\mu_x$ is the mean of the anomaly scores for the tKPI in the selected time window, $\sigma_y$ is the standard deviation of the cKPI under analysis in the selected time window, $\mu_y$ is the mean of the cKPI under analysis in the selected time window, E[ ] is the expected value, and $X_t$ and $Y_t$ are the anomaly scores and observed cKPI values, respectively.

Figure 6A:
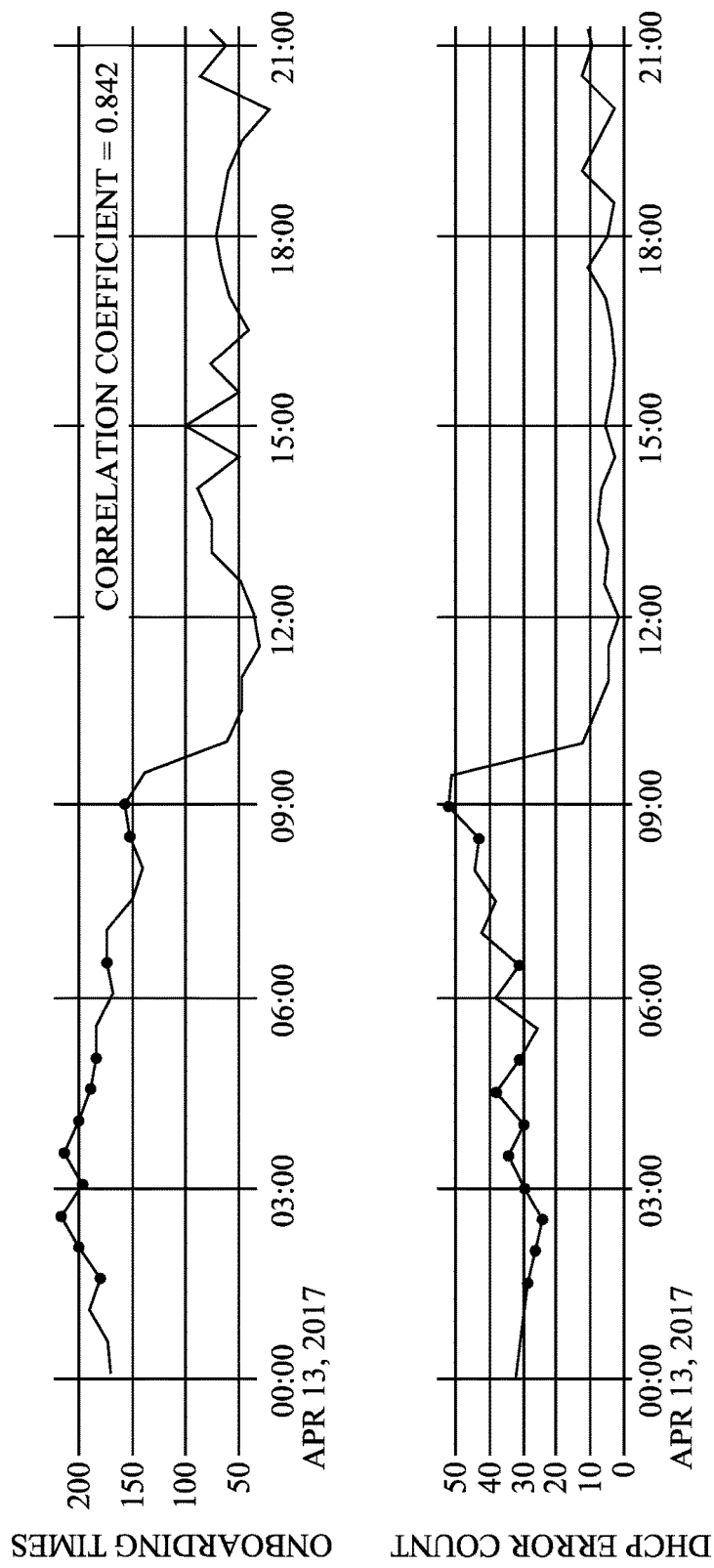
FIGS. 6A-6B illustrate example cross-correlation scores of KPIs.
Figure 6B:
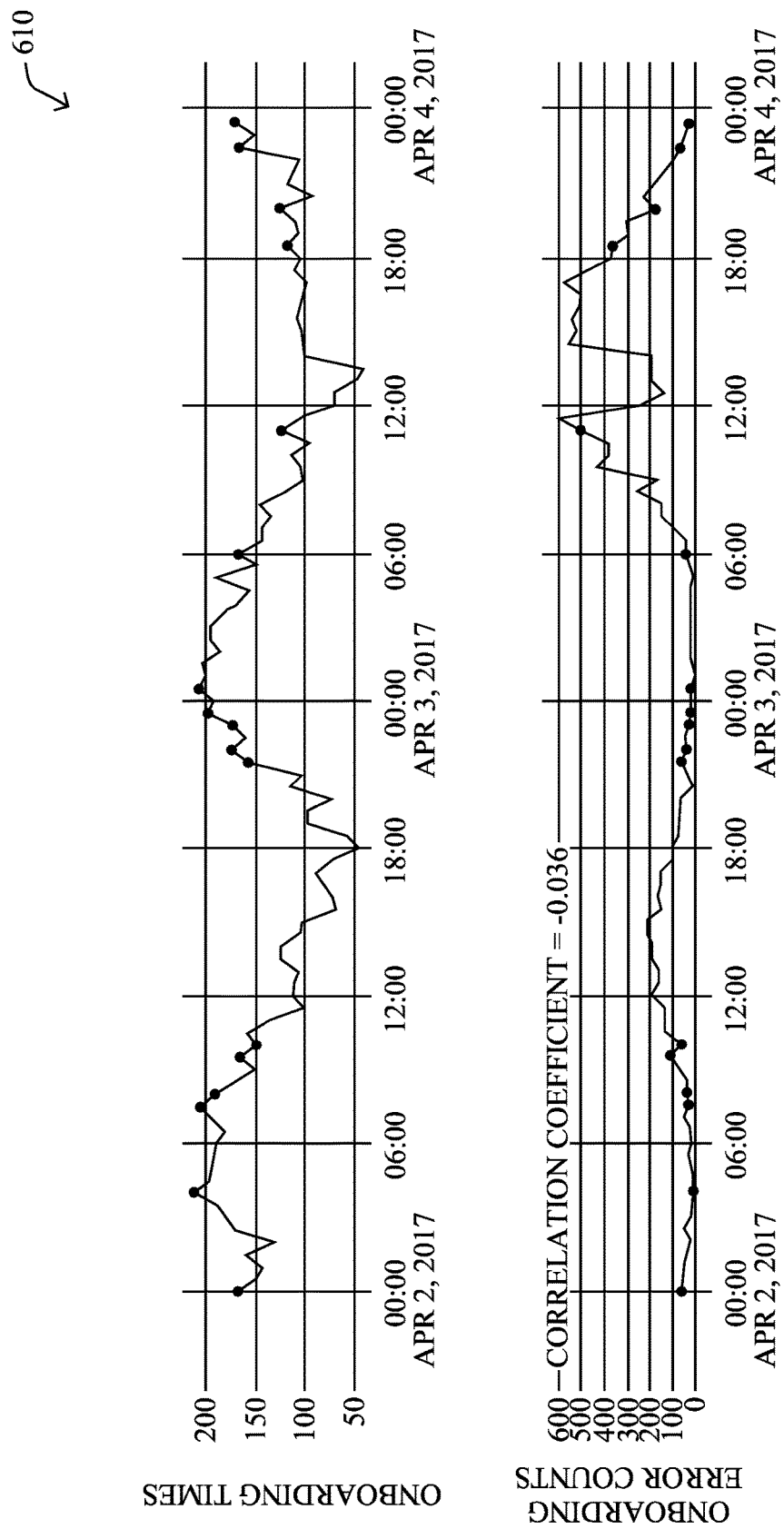

FIGS. 6A-6B illustrate example cross-correlation scores of KPIs, in various embodiments. As shown in FIG. 6A, plot 600 depicts the time series of onboarding times observed in the monitored network over the course of a day (e.g., a tKPI) vis-à-vis the observed DHCP error counts observed during this time window (e.g., a cKPI). Each dot highlighted in these time series corresponds to a detected anomaly in the onboarding time. From these time series, the resulting cross-correlation coefficient between the anomaly scores for the tKPI and the cKPI is 0.842, indicating a very high degree of cross-correlation.

In FIG. 6B, plot 610 illustrates another time series of onboarding times observed in the monitored network over the course of two days (e.g., a tKPI) vis-à-vis the observed onboarding error counts observed during this time window (e.g., a cKPI). Similar to FIG. 6A, the dots highlighted in each of these time series correspond to points in time at which the tKPI is anomalous. In contrast to FIG. 6A, however, the resulting cross-correlation coefficient calculated from the time series in FIG. 6B is −0.036, indicating low cross-correlation between the tKPI and cKPI in this example.

Referring again to FIG. 4, KPI cross-correlator 410 may compare the computed cross-correlation scores for the cKPIs against a defined correlation threshold, which may be set manually via the UI provided by output and visualization interface 318 or set automatically, in various embodiments. Based on these comparisons, KPI cross-correlator 410 may select one or more of the cKPIs as possible root causes of the tKPI anomalies (e.g., those cKPIs having cross-correlation scores above the defined threshold). In turn, output and visualization interface 318 may provide an indication of these selected cKPI(s) to the UI as a suggested root cause of the tKPI anomaly. Thus, service 302 may identify, from the set of possible set of root-cause cKPIs, which of those cKPIs are actually cross-correlated with the anomaly scores for the tKPI of interest.

Figure 7:
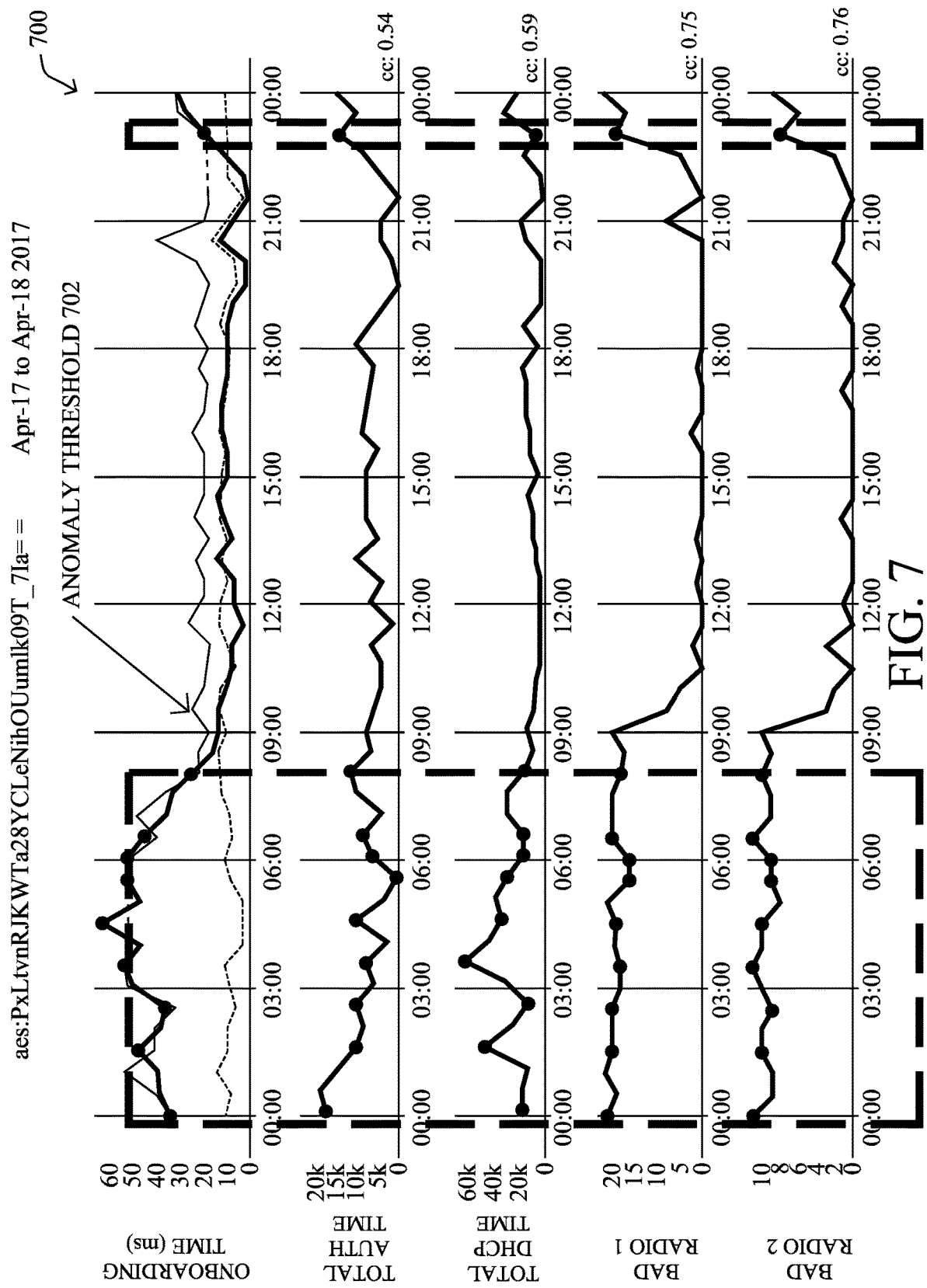
FIG. 7 illustrates an example of the detection of anomalies with respect to a KPI.

FIG. 7 illustrates an example of the detection of anomalies with respect to a KPI, in one embodiment. As shown, assume that there is a set of KPI time series 700, with the onboarding time KPI being the tKPI and the following set of cKPIs: total authentication time, total DHCP time, a first bad radio, and a second bad radio. An anomaly threshold 702 is also indicated with respect to the tKPI. Any crossing of this threshold by the tKPI corresponds to an anomaly. The times of these tKPI anomalies are highlighted as dots on the time series shown.

For each of the cKPI time series shown, a cross-correlation score (cc) is also shown that represents the cross-correlation between that cKPI and the anomaly scores for the tKPI. Notably, the total authentication time cKPI has a cc=0.54, the total DHCP time cKPI has a cc=0.59, the bad first radio cKPI has a cc=0.75, and the bad second radio cKPI has a cc=0.76. Depending on the correlation threshold set, any or all of the cKPIs may be considered the root cause of the anomalous onboarding times. Indeed, the high onboarding time could be because of bad radios, unusually long DHCPtime, or unusually long authentication time, in this specific example.

Referring again to FIG. 4, architecture 400 may also include an adaptive threshold module 412, in various embodiments. During execution, adaptive threshold module 412 may be configured to dynamically adjust the correlation threshold used by KPI cross-correlator 410 to select and report cKPIs as the root cause of a tKPI anomaly. For example, in one embodiment, adaptive threshold module 412 may do so based on feedback received by output and visualization interface 318 via the UI regarding the reported anomalies and/or cKPI(s) indicated as the causes of the anomalies. Such a mechanism may be used to ensure that only the most likely cKPIs are presented to the user as the root cause of a tKPI anomaly.

As would be appreciated, lowering the correlation threshold used by KPI cross-correlator 410 would unavoidably lead to more cKPI being selected as potential root causes. In some cases, however, it may be possible to obtain feedback about the relevancy of the anomaly alerts reported via the UI. In some embodiments, adaptive threshold module 412 may use machine learning on this relevancy feedback, to find the optimum value for the correlation threshold that produces the optimum rate for positive feedback. For example, a machine learning-based classifier that takes as input the different correlation coefficients for each cKPI and the user feedback (e.g., like/dislike) as labels can quickly identify what is an acceptable level of correlation for each cKPI.

As noted above, performing cross correlation of time series at similar time scales may sometimes be too limited. Indeed, when raising an anomaly using 30 day time windows, it may be that the signal correlation between the tKPI anomaly scores and a certain cKPI cannot be observed at that time scale. Thus, in various embodiments, anomaly clusterer 408 and KPI cross-correlator 410 may operate in conjunction with one another to evaluate the cross-correlation scores for the cKPIs using different time windows. In other words, changes in the network context that causes an anomaly on an observed tKPI can happen at different time scales, so correlations need to be considered at multiple times scales, to capture all possible cKPIs that may be at the root cause.

FIGS. 8A-8B illustrate examples of the cross correlation of a KPI with anomaly scores in different time windows. In FIG. 8A, plots 800 depict the time series of the tKPI anomaly score using one hour aggregation time windows, as well as the corresponding average client count cKPI time series. From this, the resulting cross-correlation score is only 0.17. However, if the time window is increased to 6 hours, as shown in plots 810 in FIG. 8B, the cross-correlation score increases to 0.38. Thus, the selected time window can also heavily influence the cross-correlation score, meaning that different time windows should be explored for each cKPI, in various embodiments.

Referring yet again to FIG. 4, another component of architecture 400 may be output filter 414, in some embodiments. During execution, output filter 414 may be applied to the set of cKPI(s) selected by KPI cross-correlator 410, as detailed above. Indeed, a simple cross correlation may not be sufficient and may lead to incorrect conclusions, in some cases. A common situation is, for example, when two signals are highly correlated but the related cKPI cannot explain the anomalous tKPI. For example, consider the case of proportion of failed on-boarding and the selected cKPI being the number of DHCP timeouts. If the proportion of failed on-boarding gets very high when there are 80 clients and a small spike of DHCP timeouts is observed that impacts 5 client, it cannot impact the percentage of failed on-boarding for 80 clients by itself. In order to filter out such improper selection of cKPI, in some embodiments, output filter 414 may employ a series of SME-defined, rule-based filters on the selected cKPI(s). Key cKPIs need to have a sufficient statistics that need to be met, for the issue to be relevant. For example, consider the case of low throughput. If there is only one or two clients on a radio and the interference (<20) and traffic (<10) are below a sufficiency statistic, the issue should be filtered out and not be presented. Accordingly, output filter 414 may make these filtering decisions, based on a set of thresholds for a few key cKPI, as specified by network SME via the UI.

In further embodiments, a contextual cross-correlation approach can be used by output filter 414 to learn correlation, in addition to the respective ranges for the cKPI values based on user feedback. Doing so may avoid selecting a cKPI simply because both signal vary similarly, but also taking into account the full context of their respective value, which refers to a categorical variable (e.g., the type of SSID, deployment mode, etc.) associated with the range of values overserved for the candidate cKPIs.

Finally, as shown, architecture 400 may include spike detector 416. When executed, spike detector 416 may be configured to detect spikes in the cKPIs and further reduce the set of possible root-cause cKPIs for a given tKPI anomaly. Indeed, it is very common to detect a cKPI of interest when the signal spikes simultaneously with the anomaly. For this purpose, spike detector 416 may include an auto-encoder, which is a machine learning mechanism that takes as input a multi-dimensional signal (here, candidate cKPIs) and learns to reconstruct it with some constraint, which can be of two types: (1) dimensionality reduction or (2) sparsity. In both cases, the auto-encoder attempts to project the high-dimensionality input single onto a lower-dimensionality manifold, thereby exploiting the natural correlation among the different dimensions. An auto-encoder can, therefore, be used as a very efficient approach to identify so-called correlated breakage (e.g., situations wherein signals that are usually correlated become inconsistent). This can serve as a way to detect spikes that occur on one cKPI and not on another. For example, if the client count decreases suddenly, but no change is detected in traffic, this can be a sign of a problem. When such breakages are detected by spike detector 416 and co-occur with the anomaly, this can be a very strong probable cause.

Figure 9:
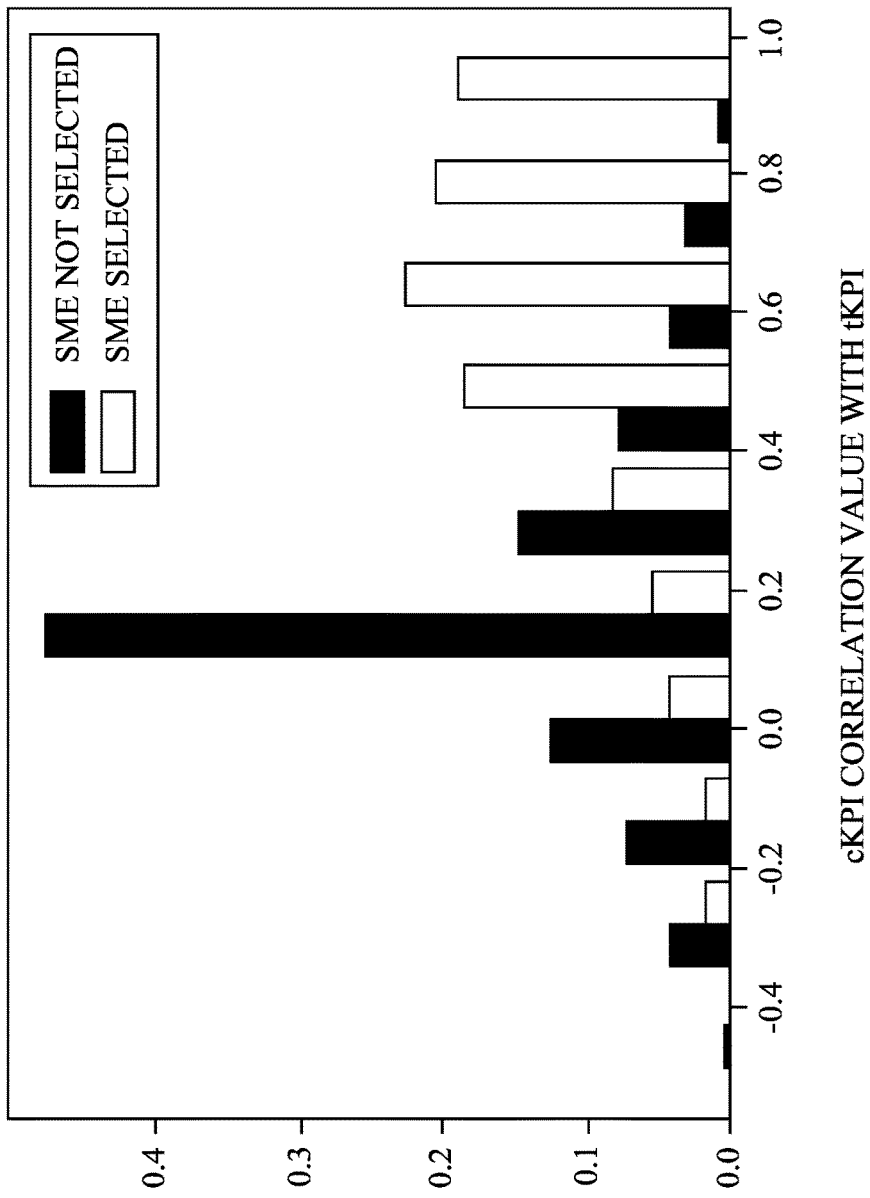
FIG. 9 illustrates a histogram of KPI cross-correlation scores observed during testing.

A prototype was constructed using the techniques herein and tested using actual data from an observed network. As part of this testing, subject matter experts were asked to select the cKPI(s) which explain the root cause for different issues (e.g., tKPI anomalies). Histogram 900 in FIG. 9 illustrates the results of this testing. As can be seen from histogram 900, the subject matter experts correctly selected those cKPIs as potential root causes of the tKPI anomalies as the potential root cause of that issue. This proves that the cross-correlation techniques herein are able to reliably be used for purposes of identifying the root cause(s) of an observed network issue.

Figure 10:
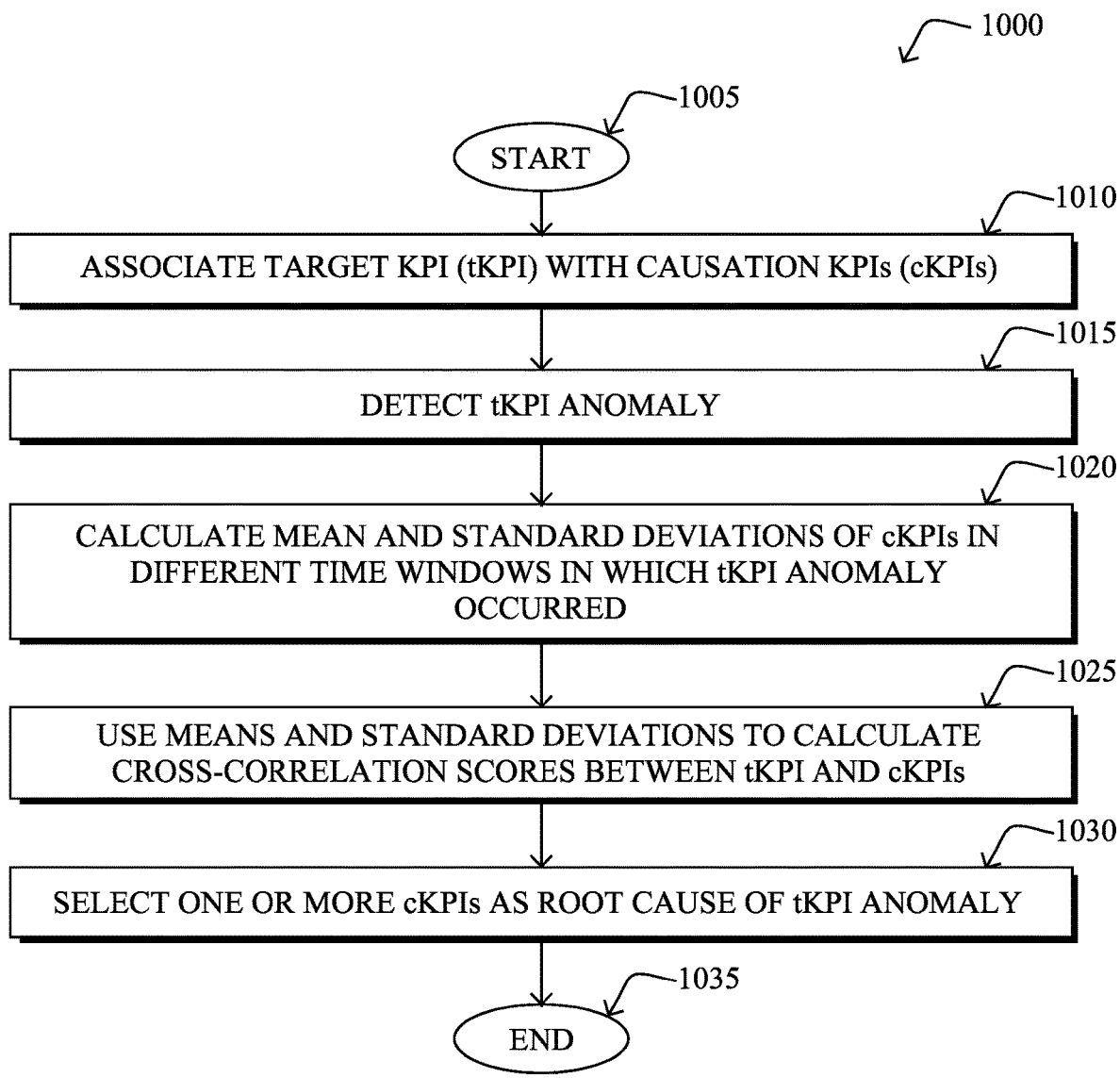
FIG. 10 illustrates an example simplified procedure for performing root cause analysis in a network assurance service.

FIG. 10 illustrates an example simplified procedure for performing root cause analysis in a network assurance service, in accordance with one or more embodiments described herein. For example, a non-generic, specifically configured device (e.g., device 200) may perform procedure 1000 by executing stored instructions (e.g., process 248), to provide a network assurance service to a monitored network. The procedure 1000 may start at step 1005, and continues to step 1010, where, as described in greater detail above, the network assurance service may associate a target key performance indicator (tKPI) measured from the network with a plurality of causation key performance indicators (cKPIs) measured from the network that may indicate a root cause of a tKPI anomaly. In various embodiments, this association may be based on a selection of the cKPIs received by the service from a user interface for association with the tKPI. In other cases, the set of cKPIs may be pre-selected for evaluation.

At step 1015, as detailed above, the network assurance service may apply a machine learning-based anomaly detector to the tKPI over time, to generate tKPI anomaly scores. Such an anomaly detector may, in some cases, be an unsupervised model that detects anomalous changes in the tKPI. Example tKPIs may include any KPI observed from the network that may be of interest. For example, one potential tKPI may quantify the onboarding times for wireless clients of the network and the anomaly detector may assess whether the onboarding times at any particular point in time is abnormal. In such a case, the cKPIs may comprise one or more of: a DHCP error count, a number of clients being onboarded to the network, or a number of AAA authentication failures.

At step 1020, the network assurance service may calculate, for each of cKPIs, a mean and standard deviation of that cKPI using a plurality of different time windows associated with the tKPI anomaly scores.

At step 1025, as detailed above, the network assurance service may use the calculated means and standard deviations of the cKPIs in the different time windows to calculate cross-correlation scores between the tKPI anomaly scores and the cKPIs. Notably, a given cKPI may be highly cross-correlated with the anomaly scores for the tKPI using one time window, but only minimally cross-correlated or not correlated at all, using a different time window. By evaluating the cross-correlation scores using different time windows, this allows the network assurance service to better identify those cKPIs that are the root cause of the tKPI anomalies.

At step 1030, the network assurance service may select one or more of the cKPIs as the root cause of the tKPI anomaly based on their calculated cross-correlation scores. For example, in one embodiment, the network assurance service may select those cKPIs as root causes, if their cross-correlation scores exceed a defined correlation threshold. In some embodiments, this threshold may be specified manually via a UI. In further embodiments, the network assurance service may dynamically adjust the threshold, based on feedback received from the UI. Procedure 1000 then ends at step 1035.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of the root cause of an anomalous KPI in a network. In some aspects, a set of KPIs can be evaluated for their cross-correlation with anomaly scores for a target KPI. Those KPIs that are cross-correlated above a certain threshold can then be considered the root cause of anomalies exhibited by the target KPI.

While there have been shown and described illustrative embodiments that provide for using machine learning based on cross-signal correlation for root cause analysis in a network assurance service, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    associating, by a network assurance service that monitors a network, a target key performance indicator (tKPI) measured from the network with a plurality of causation key performance indicators (cKPIs) measured from the network that may indicate a root cause of a tKPI anomaly;
    applying, by the network assurance service, a machine learning-based anomaly detector to the tKPI over time, to generate tKPI anomaly scores;
    calculating, by the network assurance service and for each of cKPIs, a mean and standard deviation of that cKPI using a plurality of different time windows associated with the tKPI anomaly scores;
    using, by the network assurance service, the calculated means and standard deviations of the cKPIs in the different time windows to calculate cross-correlation scores between the tKPI anomaly scores and the cKPIs;
    comparing the calculated cross-correlation scores to a defined correlation threshold;
    using, by the network assurance service, an auto-encoder to detect a spike in a particular cKPI relative to one or more of the other cKPIs;
    selecting the one or more cKPIs as the root cause of the tKPI anomaly based in part on the detected spike and on at least one of their cross-correlation scores exceeding the defined correlation threshold; and
    dynamically adjusting, by the network assurance service, the correlation threshold, based on feedback from a user interface regarding the selected one or more cKPIs.

2. The method as in claim 1, wherein associating the tKPI with the plurality of cKPIs comprises:
    receiving, at the network assurance service, a selection of the cKPIs from a user interface for association with the tKPI.

3. The method as in claim 1, wherein the tKPI indicates onboarding times for wireless clients of the network, and wherein the cKPIs comprise one or more of: a Dynamic Host Configuration Protocol (DHCP) error count, a number of clients being onboarded to the network, or a number of Authentication, Authorization and Accounting (AAA) authentication failures.

4. The method as in claim 1, further comprising:
providing, by the network assurance service, an indication of the one or more cKPIs selected as the root cause of the tKPI anomaly to a user interface.

5. The method as in claim 1, further comprising:
adjusting, by the network assurance service, the plurality of cKPIs associated with the tKPI to exclude a particular cKPI that was not selected as a root cause of the tKPI anomaly.

6. The method as in claim 1, wherein the network assurance service is a cloud-based service.

7. An apparatus, comprising:
one or more network interfaces to communicate with a network;
a processor coupled to the network interfaces and configured to execute one or more processes; and
a memory configured to store a process executable by the processor, the process when executed configured to:
associate a target key performance indicator (tKPI) measured from a monitored network with a plurality of causation key performance indicators (cKPIs) measured from the monitored network that may indicate a root cause of a tKPI anomaly;
apply a machine learning-based anomaly detector to the tKPI over time, to generate tKPI anomaly scores;
calculate, for each of cKPIs, a mean and standard deviation of that cKPI using a plurality of different time windows associated with the tKPI anomaly scores;
use the calculated means and standard deviations of the cKPIs in the different time windows to calculate cross-correlation scores between the tKPI anomaly scores and the cKPIs;
compare the calculated cross-correlation scores to a defined correlation threshold;
use, by the network assurance service, an auto-encoder to detect a spike in a particular cKPI relative to one or more of the other cKPIs;
select the one or more cKPIs as the root cause of the tKPI anomaly based in part on the detected spike and on at least one of their cross-correlation scores exceeding the defined correlation threshold; and
dynamically adjust, by the network assurance service, the correlation threshold, based on feedback from a user interface regarding the selected one or more cKPIs.

8. The apparatus as in claim 7, wherein the apparatus associates the tKPI with the plurality of cKPIs by:
receiving a selection of the cKPIs from a user interface for association with the tKPI.

9. The apparatus as in claim 7, wherein the tKPI indicates onboarding times for wireless clients of the network, and wherein the cKPIs comprise one or more of: a Dynamic Host Configuration Protocol (DHCP) error count, a number of clients being onboarded to the network, or a number of Authentication, Authorization and Accounting (AAA) authentication failures.

10. The apparatus as in claim 7, wherein the process when executed is further configured to:
provide an indication of the one or more cKPIs selected as the root cause of the tKPI anomaly to a user interface.

11. The apparatus as in claim 7, wherein the process when executed is further configured to:
adjust the plurality of cKPIs associated with the tKPI to exclude a particular cKPI that was not selected as a root cause of the tKPI anomaly.

12. The apparatus as in claim 7, wherein the process when executed is further configured to:
filter one of the selected cKPIs as a root cause of the tKPI anomaly.

13. A tangible, non-transitory, computer-readable medium storing program instructions that cause a network assurance service that monitors a network to execute a process comprising:
associating, by the network assurance service, a target key performance indicator (tKPI) measured from the network with a plurality of causation key performance indicators (cKPIs) measured from the network that may indicate a root cause of a tKPI anomaly;
applying, by the network assurance service, a machine learning-based anomaly detector to the tKPI over time, to generate tKPI anomaly scores;
calculating, by the network assurance service and for each of cKPIs, a mean and standard deviation of that cKPI using a plurality of different time windows associated with the tKPI anomaly scores;
using, by the network assurance service, the calculated means and standard deviations of the cKPIs in the different time windows to calculate cross-correlation scores between the tKPI anomaly scores and the cKPIs;
selecting, by the network assurance service, one or more of the cKPIs as the root cause of the tKPI anomaly based on their calculated cross-correlation scores;
comparing the calculated cross-correlation scores to a defined correlation threshold;
using, by the network assurance service, an auto-encoder to detect a spike in a particular cKPI relative to one or more of the other cKPIs;
selecting the one or more cKPIs as the root cause of the tKPI anomaly based in part on the detected spike and on at least one of their cross-correlation scores exceeding the defined correlation threshold; and
dynamically adjusting, by the network assurance service, the correlation threshold, based on feedback from a user interface regarding the selected one or more cKPIs.

14. The computer-readable medium as in claim 13, wherein the process further comprises:
providing, by the network assurance service, an indication of the one or more cKPIs selected as the root cause of the tKPI anomaly to a user interface.

* * * * *